(12) United States Patent
Li et al.

(10) Patent No.: US 10,660,367 B2
(45) Date of Patent: May 26, 2020

(54) LIQUID SUPPLY, ATOMIZER AND ELECTRONIC CIGARETTE HAVING SAME

(71) Applicant: Shenzhen First Union Technology Co., Ltd., Shenzhen, Guangdong Province (CN)

(72) Inventors: Yonghai Li, Shenzhen (CN); Zhongli Xu, Shenzhen (CN); Zhanjun Jiang, Shenzhen (CN)

(73) Assignee: SHENZHEN FIRST UNION TECHNOLOGY CO., LTD., Shenzhen, Guangdong Province (CN)

( * ) Notice: Subject to any disclaimer, the term of this patent is extended or adjusted under 35 U.S.C. 154(b) by 823 days.

(21) Appl. No.: 15/340,987

(22) Filed: Nov. 2, 2016

(65) Prior Publication Data

US 2017/0071258 A1 Mar. 16, 2017

(30) Foreign Application Priority Data

Nov. 4, 2015 (CN) .................... 2015 2 0871409 U

(51) Int. Cl.
 *A24F 47/00* (2020.01)
 *F22B 1/28* (2006.01)
 *F16K 15/02* (2006.01)

(52) U.S. Cl.
 CPC .......... *A24F 47/008* (2013.01); *F16K 15/025* (2013.01); *F22B 1/284* (2013.01)

(58) Field of Classification Search
 CPC .. A61M 11/04; A61M 11/041; A61M 11/042; A61M 15/08
 See application file for complete search history.

(56) References Cited

U.S. PATENT DOCUMENTS

| | | | | |
|---|---|---|---|---|
| 4,663,091 A * | 5/1987 | Seo | .......................... | A61L 2/035 210/748.01 |
| 5,144,962 A * | 9/1992 | Counts | ................... | A24F 47/008 131/194 |
| 5,726,421 A * | 3/1998 | Fleischhauer | ......... | A24F 47/008 131/182 |
| 5,746,359 A * | 5/1998 | Stanek | ...................... | F24F 1/02 220/304 |
| 6,006,701 A * | 12/1999 | Nagano | .................... | B01D 1/00 118/726 |
| 6,176,474 B1 * | 1/2001 | Stanek | ..................... | B65D 1/18 261/66 |
| 6,805,336 B2 * | 10/2004 | Rhea | ..................... | F16K 15/185 222/490 |

(Continued)

*Primary Examiner* — Viet Le
(74) *Attorney, Agent, or Firm* — Cheng-Ju Chiang

(57) ABSTRACT

The present disclosure relates to a liquid supply for an electronic cigarette. The liquid supply is configured for connecting with an atomizing device. The liquid supply includes a housing, a liquid outlet, a movable valve, and an elastic element. The housing defines a liquid chamber configured for storing tobacco liquid. The housing has an open end configured for connecting with the atomizing device. The liquid outlet is defined in the open end. The movable valve is movably arranged in the open end. The elastic element elastically abuts against the movable valve such that the valve seals the liquid outlet. When the liquid supply is coupled to the atomizing device, the valve is capable of being pushed by the atomizing device to a position where the liquid outlet is opened.

12 Claims, 5 Drawing Sheets

(56) References Cited

U.S. PATENT DOCUMENTS

| | | | | |
|---|---|---|---|---|
| 6,929,041 B2* | 8/2005 | Falligant | A61M 16/183 | 141/351 |
| 8,511,318 B2* | 8/2013 | Hon | A24F 47/002 | 131/273 |
| 9,060,548 B2* | 6/2015 | Zheng | H01R 13/66 | |
| 9,498,588 B2* | 11/2016 | Benassayag | A61M 15/06 | |
| 9,848,647 B2* | 12/2017 | Memari | A24F 15/12 | |
| 10,234,153 B2* | 3/2019 | Bae | F24F 6/00 | |
| 2007/0045288 A1* | 3/2007 | Nelson | A61M 11/041 | 219/533 |
| 2008/0023003 A1* | 1/2008 | Rosenthal | A61M 11/041 | 128/203.26 |
| 2008/0257367 A1* | 10/2008 | Paterno | A24F 47/008 | 131/328 |
| 2009/0078253 A1* | 3/2009 | Bao | A61M 11/041 | 128/203.26 |
| 2009/0266358 A1* | 10/2009 | Sacristan Rock | A61M 16/104 | 128/203.26 |
| 2011/0284579 A1* | 11/2011 | Pardes | A61F 9/0008 | 222/207 |
| 2012/0174914 A1* | 7/2012 | Pirshafiey | A61M 11/041 | 128/200.14 |
| 2013/0199528 A1* | 8/2013 | Goodman | F22B 1/282 | 128/203.26 |
| 2013/0333700 A1* | 12/2013 | Buchberger | A24F 47/008 | 128/203.26 |
| 2014/0041655 A1* | 2/2014 | Barron | A61M 11/042 | 128/202.21 |
| 2015/0282530 A1* | 10/2015 | Johnson | A61M 15/06 | 392/387 |
| 2016/0150824 A1* | 6/2016 | Memari | A24F 15/12 | 131/329 |
| 2017/0035115 A1* | 2/2017 | Monsees | H05B 1/0244 | |
| 2019/0124982 A1* | 5/2019 | Atkins | A24F 47/008 | |
| 2019/0239567 A1* | 8/2019 | Rucker | A24F 47/008 | |
| 2019/0269811 A1* | 9/2019 | Trzecieski | A61L 9/03 | |

* cited by examiner

LIQUID SUPPLY, ATOMIZER AND ELECTRONIC CIGARETTE HAVING SAME

TECHNICAL FIELD

The present invention relates to electronic cigarettes, and particularly to a liquid supply, an atomizer and an electronic cigarette using same.

BACKGROUND ART

A typical atomizer includes a liquid supply and an atomizing device. The liquid supply is configured for storing tobacco liquid, and the tobacco liquid is usually sealed by aluminum foil. The atomizing device includes a pricking component. When the liquid supply is coupled to the atomizing device, the pricking component pierces the aluminum foil, so that the tobacco liquid flows into the atomizing device. However, when replacing the liquid supply with a new one, the tobacco liquid remained in the liquid supply may flow out and pollute the atomizing device. Accordingly, user experience of the atomizer is unsatisfactory.

What are needed, therefore, are a liquid supply, an atomizer and an electronic cigarette using same, which can overcome the above shortcomings.

SUMMARY

The present disclosure relates to a liquid supply for an electronic cigarette. The liquid supply is configured for connecting with an atomizing device. The liquid supply includes a housing, a liquid outlet, a movable valve, and an elastic element. The housing defines a liquid chamber configured for storing tobacco liquid. The housing has an open end configured for connecting with the atomizing device. The liquid outlet is defined in the open end. The movable valve is movably arranged in the open end. The elastic element elastically abuts against the movable valve such that the valve seals the liquid outlet. When the liquid supply is coupled to the atomizing device, the valve is capable of being pushed by the atomizing device to a position where the liquid outlet is opened.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
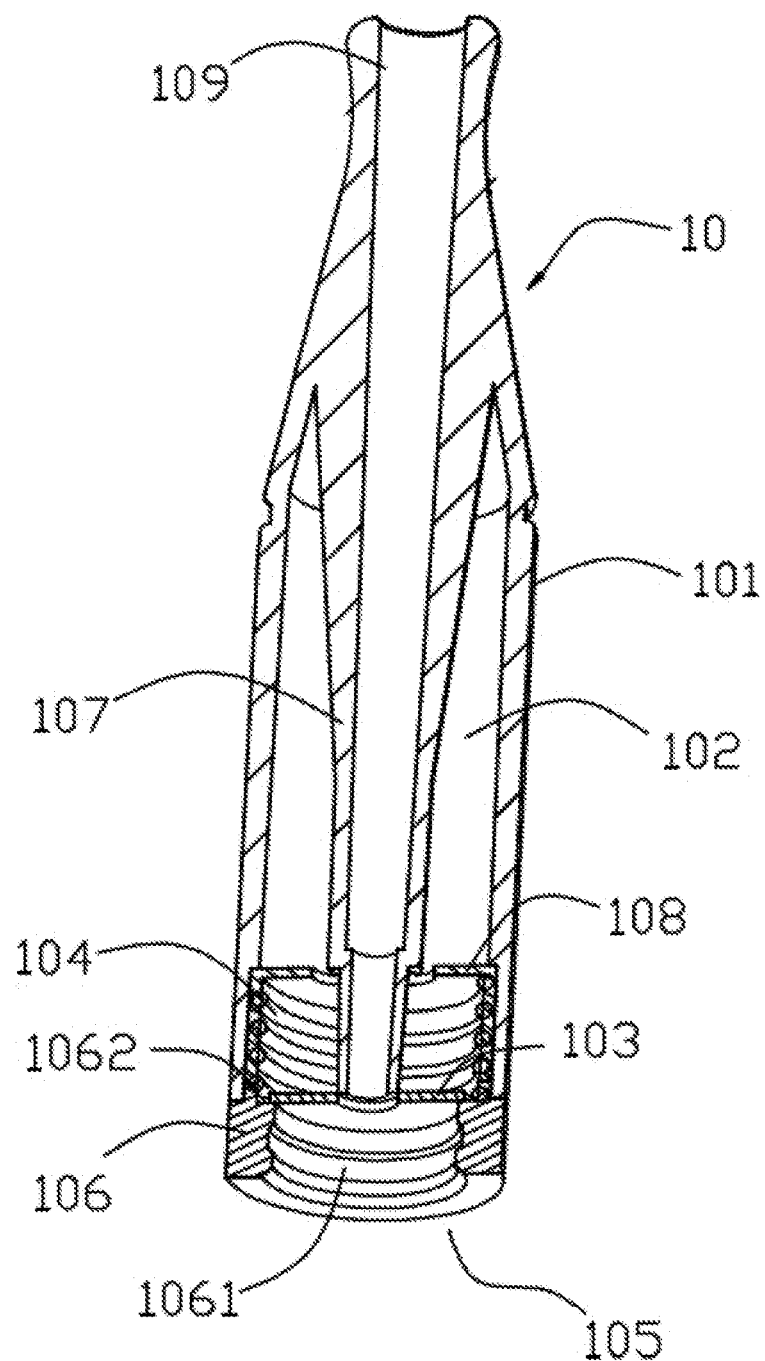
FIG. 1 is a cross-sectional view of a liquid supply according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Several definitions that apply throughout this disclosure will now be presented.

The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
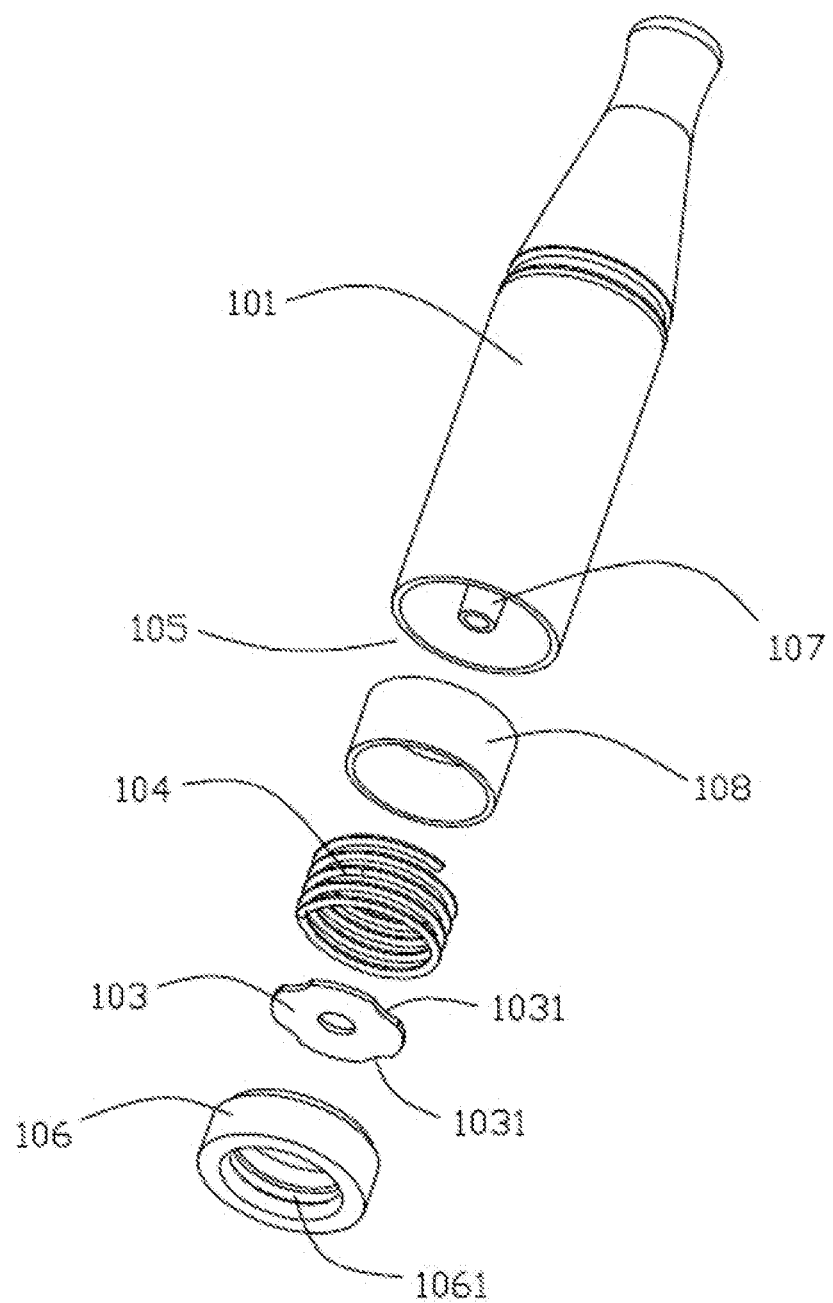
FIG. 2 is an exploded perspective view of the liquid supply of FIG. 1.
Figure 3:
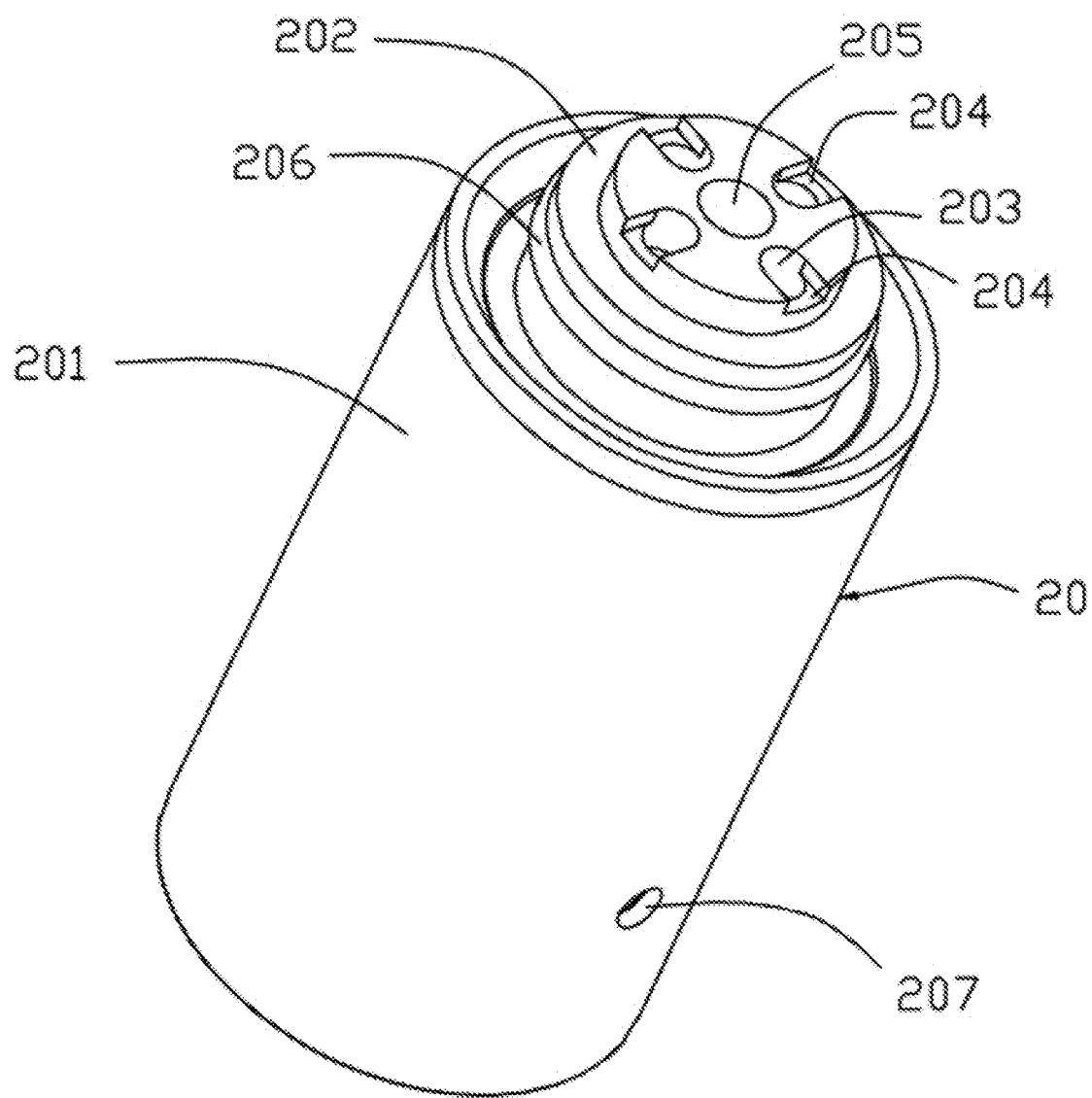
FIG. 3 is a perspective view of an atomizing device according to a second embodiment.

Referring to FIGS. 1-2, a liquid supply 10 includes a housing 101 defining a liquid chamber 102 configured (i.e., structured and arranged) for storing tobacco liquid. The housing 101 extends along a lengthwise direction, and includes an open end 105 configured for connecting with an atomizing device 20 (as seen in FIG. 3). The open end 105 defines a liquid outlet 110 (referring to FIG. 4), through which the tobacco liquid in the liquid chamber 102 flows out. A movable valve and an elastic element are arranged in the open end 105. The elastic element elastically abuts against the valve, such that the valve seals the liquid outlet 110. When the liquid supply 10 is connected to the atomizing device 20, the valve is pushed open, so that the liquid outlet 110 is opened.

Quite usefully, the valve is a sealing piece 103. The sealing piece 103 is movable along an axial direction of the housing 101 to open or close the liquid outlet 110. Quite usefully, the elastic element is a spring 104, an end of the spring 104 abuts against the sealing piece 103, and the spring 104 is configured for exerting an elastic restoring force on the sealing piece 103. The open end 105 further includes a support 108. The support 108 is cylindrical, and is hermetically engaged in the housing 101 by interference fit. The spring 104 is received in the support 108, and an opposite end of the spring 104 abuts against a top wall of the support 108. The support 108 defines a through hole in communication with the liquid chamber 102. It is noteworthy that, in other embodiments, the valve may be other forms, for example, a spherical valve.

Figure 4:
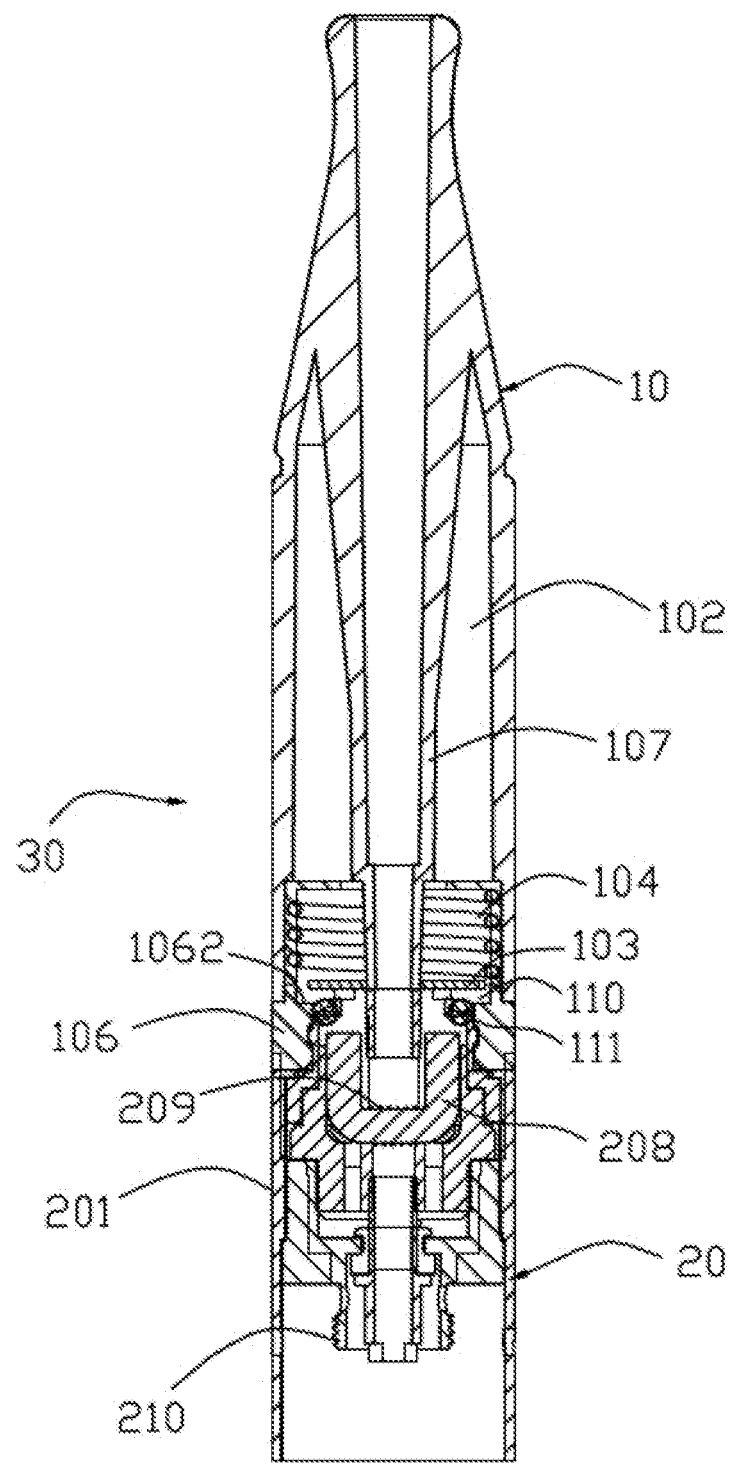
FIG. 4 is a cross-sectional view of an atomizer according to a third embodiment.

The open end 105 further includes an assembling holder 106 fixedly mounted in the housing 101. The assembling holder 106 includes a step portion 1062, and a bottom surface of the sealing piece 103 abuts against the step portion 1062. During movement of the sealing piece 103, a gap is formed between the sealing piece 103 and the step portion 1062, and the gap serves as the liquid outlet 110 (as seen in FIG. 4). In a normal state, the liquid supply 10 is not engaged with the atomizing device 20, the sealing piece 103 tightly abuts against the step portion 1062, and no liquid outlet 110 is formed yet. When the liquid supply 10 is engaged with the atomizing device 20, an end of the atomizing device 20 is inserted into the open end 105 and pushes the sealing piece 103 to form the liquid outlet 110, and the tobacco liquid flows into the atomizing device 20. When the atomizing device 20 is disengaged from the liquid supply 10, the sealing piece 103 is driven by the spring 104 to seal the liquid outlet 110, thus avoiding liquid leakage during this process. It is to be noted that, the liquid outlet 110 may be formed in the assembling holder 106 or the housing 101.

The assembling holder 106 defines an annular groove 1061 on an inner surface configured for coupling with the atomizing device 20. An air pipe 107 is arranged in the housing 101 along an axial direction. The valve 103 defines a through hole at a central part. The valve 103 nests an end of the air pipe 107, and is movable along the air pipe 107. The valve 103 is hermetically coupled with the air pipe 107. In the present embodiment, the air pipe 107 and the housing 101 are integrally formed, and the liquid chamber 102 is defined between the air pipe 107 and the housing 101. A top end of the air pipe 107 is connected with the mouthpiece 109. In the present embodiment, the mouthpiece 109 and the air pipe 107 are also integrally formed.

Referring to FIGS. 3-4, an atomizer 30 includes the above liquid supply 10 and an atomizing device 20. The atomizing device 20 includes a main body 201 and an atomizing unit arranged in the main body 201. The main body 201 includes a connecting part 202 configured for coupling with the open end 105. The connecting part 202 defines at least one liquid inlet 203. In the present embodiment, the connecting part 202 defines four liquid inlets equiangularly arranged. The main body 201 defines an air inlet 207 at a bottom part. The connecting part 202 defines an air outlet 205 in a central part. The air outlet 205 is connected with an end of the air pipe 107. The atomizing unit in the main body 201 heats tobacco liquid to form aerosol. The aerosol is expelled from the air outlet 205, and goes along the air pipe 107.

When the atomizing device 20 is connected with the liquid supply 10, the air pipe 107 is in communication with the air outlet 205, and the connecting part 202 pushes the sealing piece 103 to move upwards, so that the liquid outlet 110 is opened (referring to FIG. 4). In this position, the tobacco liquid flows out from the liquid outlet 110, and flows into the main body 201 via the liquid inlet 203. Accordingly, the atomizer 20 can work normally. When the atomizing device 20 is detached from the liquid supply 10, the spring 104 drives the sealing piece 103 to move downwards until the sealing piece 103 tightly abuts against the step portion 1062, thus sealing the liquid outlet 110.

The atomizing unit may use a variety of atomizing techniques, such as heating or ultrasonic atomization. In the present embodiment, the atomizing unit includes a heating element 209 and a liquid conducting element 208 in contact with the heating element 209. The liquid conducting element 208 is configured for conveying tobacco liquid to the heating element 209 for atomization. The liquid conducting element 208 is U-shaped, and is made of glass fiber or porous ceramic. Two opposite ends of the liquid conducting element 208 are adjacent to the liquid inlets 203. The heating element 209 is in the form of a heating wire, and is wound around a middle portion of the liquid conducting element 208.

The atomizing device 20 and the liquid supply 10 are coupled by snap-fit connection. The connecting part 202 includes an annular protrusion 206. The connecting part 202 is inserted into the open end 105 of the liquid supply 10, and the annular protrusion 206 is engaged in the annular groove 1061.

Referring to FIGS. 2-3, quite usefully, the connecting part 202 defines at least one liquid groove 204 in an end surface adjacent to the sealing piece 103, and each of the at least one liquid groove 204 is opened to be exposed at a side wall of the connecting part 202. In the present embodiment, the connecting part 202 includes four liquid grooves 204 equiangularly arranged. Each liquid groove 204 is in communication with a respect liquid inlet 203. The sealing piece 103 defines four gaps 1031 at an edge matching with the liquid groove 204. When the connecting part of the atomizing device 20 pushes the sealing piece 103, the tobacco liquid in the liquid chamber 102 flows from the gaps 1031, the liquid groove 204, and then into the liquid inlets 203. To improve liquid-proof, a sealing ring 111 is provided between the connecting part 202 and an inner wall of the assembling holder 106, thus avoiding liquid leakage between the atomizing device 20 and the liquid supply 10. Further, a pair of electrodes 210 is arranged at a bottom of the atomizing device 20, and configured for connecting with a power supply.

Figure 5:
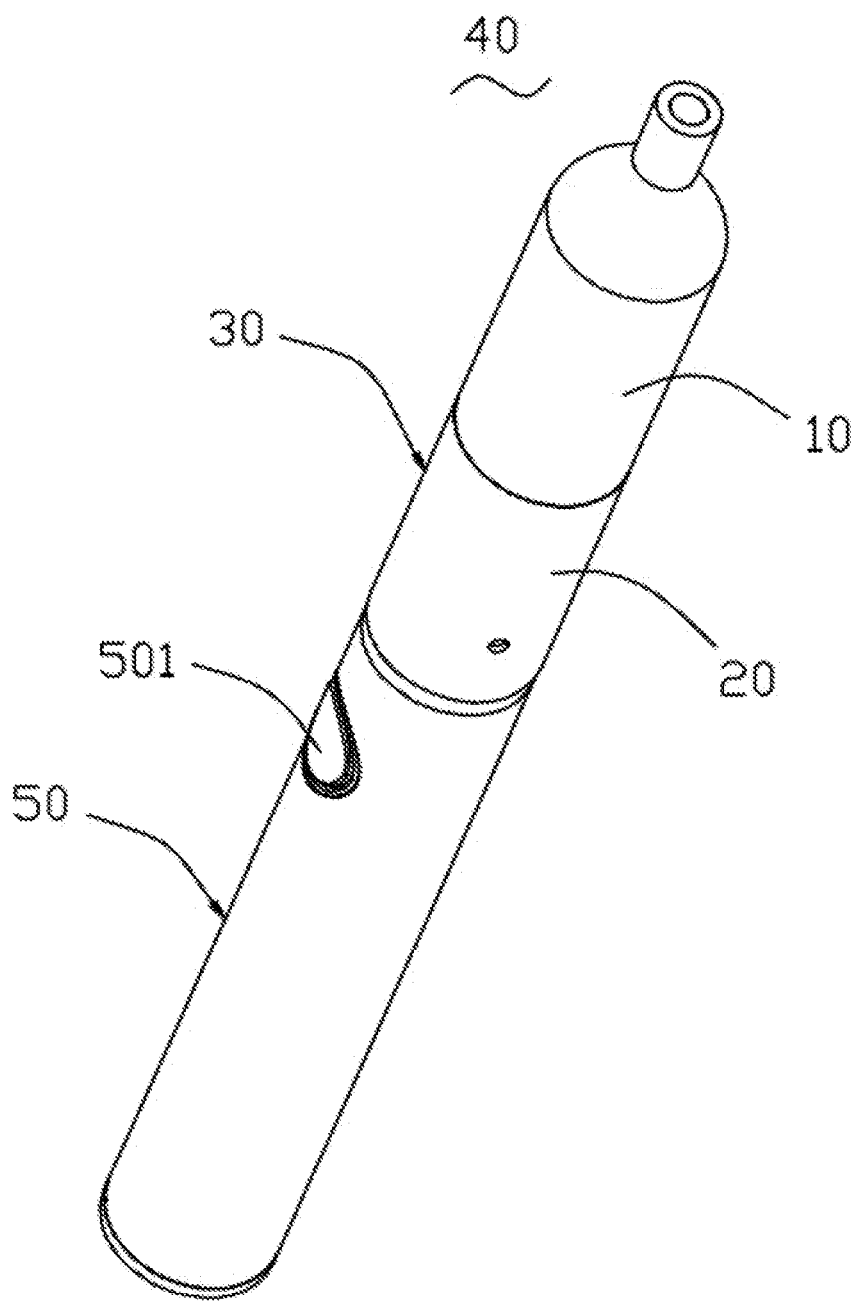
FIG. 5 is a perspective view of an electronic cigarette according to a fourth embodiment.

Referring to FIG. 5, an electronic cigarette 40 includes the atomizer 30 and a power supply 50 connected with the atomizer 30. A first end of the atomizing device 20 is connected to the liquid supply 10, and an opposite second end of the atomizing device 20 is connected to the power supply 50. The power supply 50 is configured for feeding the atomizing device 20 power. The power supply 50 includes a smoking button 501 for activating the atomizing device 20.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A liquid supply for an electronic cigarette, the liquid supply being configured for connecting with an atomizing device, the liquid supply comprising:
   a housing defining a liquid chamber configured for storing tobacco liquid, the housing having an open end configured for connecting with the atomizing device;
   a liquid outlet defined in the open end;
   a movable valve being movably arranged in the open end;
   an air pipe oriented along an axial direction of the housing, wherein the valve nests the air pipe; and
   an elastic element elastically abutting against the movable valve such that the valve seals the liquid outlet;
   wherein when the liquid supply is coupled to the atomizing device, the valve is capable of being pushed by the atomizing device to a position where the liquid outlet is opened.

2. The liquid supply according to claim 1, wherein the valve is a sealing piece movable along an axial direction of the housing, the elastic element comprises a spring, and an end of the spring abuts against the sealing piece.

3. The liquid supply according to claim 2, further comprising an assembling holder arranged in the open end, wherein the assembling holder comprises a step portion, the sealing piece hermetically abuts against the step portion, and the liquid outlet is formed between the sealing piece and the step portion when the sealing piece is pushed open.

4. The liquid supply according to claim 3, wherein the assembling holder defines an annular groove for coupling with the atomizing device by snap fit.

5. An atomizer comprising:
an atomizing device, the atomizing device comprising a main body and an atomizing unit in the main body, the main body having a connecting part configured for engaging with the open end, the connecting part defines at least one liquid inlet; and
a liquid supply in accordance with claim 1, the liquid supply being detachably connected with the atomizing device, wherein when the atomizing device is connected with the liquid supply, the connecting part pushes the valve to open the liquid outlet, so that the tobacco liquid flows out from the liquid outlet to the liquid inlet; when the atomizing device is detached from the liquid supply, the elastic element forces the valve to seal the liquid outlet.

6. The atomizer according to claim 5, wherein the connecting part is capable of inserting into the open end of the liquid supply to form a snap-fit connection.

7. The atomizer according to claim 5, wherein the atomizing unit comprising a heating element and a liquid conducting element in contact with the heating element, the liquid conducting element is configured for conveying the tobacco liquid to the heating element for atomization.

8. The atomizer according to claim 5, wherein the connecting part defines at least one liquid groove to be opened and exposed at a side wall of the connecting part, and the at least one liquid groove is in communication with the liquid inlet.

9. The atomizer according to claim 8, wherein the valve defines a gap in an edge matching with the at least one liquid groove.

10. An electronic cigarette, comprising:
an atomizer according to claim 5; and
a power supply, a first end of the atomizing device being connected to the liquid supply, and an opposite second end of the atomizing device being connected to the power supply, the power supply being configured for feeding the atomizing device power.

11. The liquid supply according to claim 1, wherein the movable valve defines at least one gap at an edge thereof in order to allow the liquid chamber being communicable with the liquid outlet through the at least one gap when the liquid outlet is opened.

12. The atomizer according to claim 8, wherein the movable valve defines at least one gap at an edge thereof in order to match with the at least one liquid groove.

* * * * *